(12) United States Patent
Callicott et al.

(10) Patent No.: US 6,343,519 B1
(45) Date of Patent: *Feb. 5, 2002

(54) METHOD AND APPARATUS FOR TOUCH DETECTION BASED ON THE VELOCITY OF AN OBJECT RELATIVE TO A SENSOR PANEL

(75) Inventors: Steven P. Callicott; Billy B. Duncan; William K. Petty; Mark S. Snyder, all of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/655,201

(22) Filed: Sep. 5, 2000

Related U.S. Application Data

(63) Continuation of application No. 08/928,366, filed on Sep. 12, 1997, now Pat. No. 6,138,523, which is a continuation of application No. 08/578,048, filed on Dec. 26, 1995, now abandoned.

(51) Int. Cl.[7] ............................................... G01N 33/00
(52) U.S. Cl. ....................................... 73/865.7; 345/173
(58) Field of Search .............................. 73/865.7, 865.8, 73/865.9; 345/173, 174; 200/512

(56) References Cited

U.S. PATENT DOCUMENTS

| | | |
|---|---|---|
| 3,904,822 A | 9/1975 | Kamm et al. |
| 3,962,679 A | 6/1976 | Engelbrecht |
| 4,384,201 A | 5/1983 | Carroll et al. |
| 4,587,630 A | 5/1986 | Straton et al. |
| 4,622,437 A | 11/1986 | Bloom et al. |
| 4,707,689 A * | 11/1987 | DiPiazza et al. ............. 340/706 |
| 4,764,885 A | 8/1988 | Greanias et al. |
| 4,952,918 A | 8/1990 | Fujita et al. |
| 5,038,142 A | 8/1991 | Flowers et al. |
| 5,266,931 A | 11/1993 | Tanaka |
| 5,376,948 A | 12/1994 | Roberts |
| 5,434,370 A | 7/1995 | Wilson et al. |
| 5,594,222 A | 1/1997 | Caldwell |
| 5,825,352 A * | 10/1998 | Bisset et al. .................. 345/173 |
| 5,920,309 A * | 7/1999 | Bisset et al. .................. 345/173 |

FOREIGN PATENT DOCUMENTS

| | | | |
|---|---|---|---|
| EP | 587201 | 3/1994 | ............ G06K/11/10 |
| JP | 313671 | * 12/1995 | |
| JP | 217213 | * 3/1997 | |
| JP | 217213 | * 10/1997 | |
| JP | 284118 | * 10/1997 | |

* cited by examiner

*Primary Examiner*—Hezron Williams
*Assistant Examiner*—Nashmiya Fayyaz

(57) ABSTRACT

An apparatus detects the approach and touch-down of an object relative to a sensor panel. The apparatus includes a digital filter for determining a first derivative of a current flow in the sensor panel and a controller determines when the first derivative reaches a maximum. In a preferred embodiment, a magnitude for current flow in a plurality of corners of the sensor panel is determined by the controller. These magnitudes are then summed to determine a current flow from which the first derivative is computed. The current flow is analyzed by the controller to determine when an object is approaching the sensor panel, has contacted the sensor panel, and is withdrawn from the sensor panel. Thresholds are used to avoid false detection of approaching objects.

8 Claims, 4 Drawing Sheets

METHOD AND APPARATUS FOR TOUCH DETECTION BASED ON THE VELOCITY OF AN OBJECT RELATIVE TO A SENSOR PANEL

This is a continuation of U.S. patent application Ser. No. 08/928,366 filed Sep. 12, 1997, now U.S. Pat. No. 6,138,523 which is a continuation of U.S. patent application Ser. No. 08/578,048 filed Dec. 26, 1995, now abandoned.

BACKGROUND OF THE INVENTION

The present invention relates generally to a touch input device, and more particularly to a method and apparatus for touch detection based on the velocity of an object relative to a sensor panel associated with a computer.

The primary use for touch in association with a sensor panel or digitizing tablet is the actuation of a button or switch by pressing the button with an object such as a stylus or an object. Detection of when the object has actually touched the screen for selection in electrostatic digitizing tablet applications cannot normally be determined by a physical switch closure. The only information available to the system is the position of the object in terms of the X-Y plane of the display screen and the relative distance away from the display (Z data). The Z data increases as the object approaches the display, and can reach some maximum value at the display plane. However, this maximum will vary from person-to-person due to the particular physical characteristics of the person such as body impedance. In addition the maximum can vary based on the existing climate and temperature conditions.

If a pure value based on this maximum is used to detect when an object touches the display, i.e. when an object touches down, then it is possible to get erroneous touch-downs while the object is still above the display screen. The same problem exists while trying to detect when an object lifts off of the display screen. For this reason, using threshold values for Z data does not allow for reliable button selection.

What is needed therefore is a method and apparatus for reliably determining when an object has contacted a sensor panel regardless of the physical characteristics of the user, and the existing climate conditions.

SUMMARY OF THE INVENTION

In accordance with one aspect of the present invention, there is provided a method for determining when an approaching object has contacted a sensor panel. The method includes the steps of (a) determining a velocity value for the approaching object relative to the sensor panel, (b) repeating step (a) until the velocity value has reached a maximum value, and (c) generating a flag signal when the velocity value has reached the maximum value to indicate that the object has contacted the sensor panel.

Pursuant to another aspect of the present invention, there is provided a method for determining when an approaching object has contacted a sensor panel. The method includes the steps of (a) using a controller which is connected to the sensor panel, (b) determining a velocity value for the approaching object based on a current flow between the sensor panel and the controller, (c) repeating step (b) until the velocity value has reached a maximum value, and (d) generating a signal when the velocity value has reached the maximum value to indicate that the object is contacting the sensor panel.

Pursuant to yet another aspect of the present invention, there is provided an apparatus for determining when an approaching object has contacted a sensor panel. The apparatus includes a mechanism for determining a velocity value of the approaching object relative to the sensor panel, a mechanism for determining when the velocity value has reached a maximum value, and a mechanism for generating a flag signal when the velocity value has reached the maximum value to indicate that the approaching object has contacted the sensor panel.

It is therefore an object of the present invention to provide a new and useful method for reliably determining when an object has contacted a sensor panel regardless of the physical characteristics of the user.

It is another object of the present invention to provide a new and useful apparatus for reliably determining when an object has contacted a sensor panel regardless of the physical characteristics of the user.

It is yet another object of the present invention to provide a new and useful method for reliably determining when an object has contacted a sensor panel regardless of the existing climate conditions.

It is yet another object of the present invention to provide a new and useful apparatus for reliably determining when an object has contacted a sensor panel regardless of the existing climate conditions.

It is a further object of the present invention to provide a new and useful method for determining when an object has contacted a sensor panel based on a change in proximity of the object relative to the sensor panel.

It is a further object of the present invention to provide a new and useful apparatus for determining when an object has contacted a sensor panel based on a change in proximity of the object relative to the sensor panel.

It is yet another object of this invention to provide a new and useful method for determining when an object has contacted a sensor panel based on a velocity of an object relative to the sensor panel.

It is another object of this invention to provide a new and useful apparatus for determining when an object has contacted a sensor panel based on a velocity of an object relative to the sensor panel.

The above and other objects, features, and advantages of the present invention will become apparent from the following description and the attached drawings.

DETAILED DESCRIPTION OF THE PREFERRED EMBODIMENTS

Figure 1:
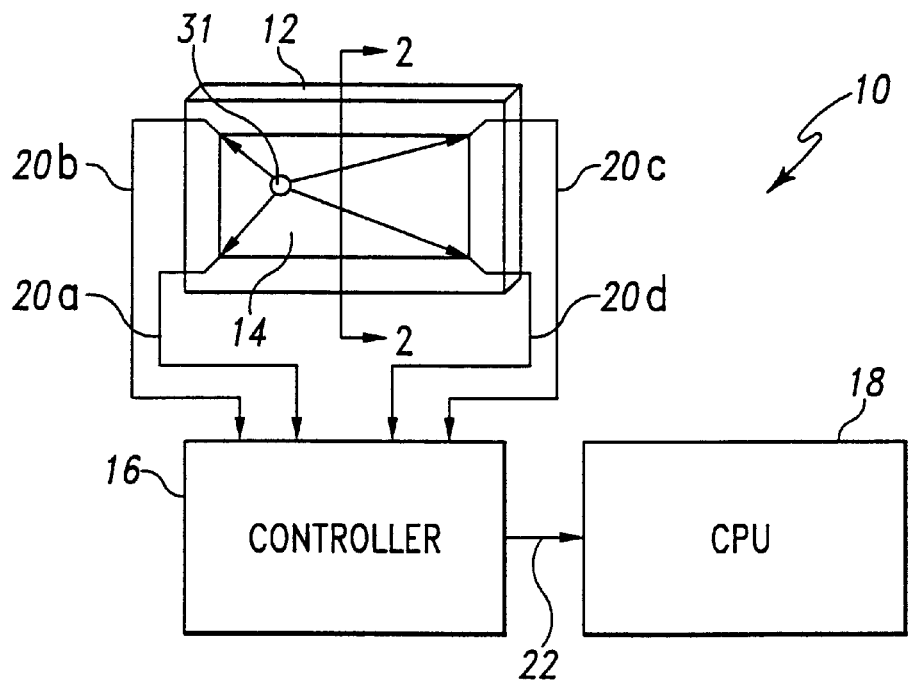
FIG. 1 is a functional block diagram of a notebook computer which incorporates the features of the present invention therein.

While the invention is susceptible to various modifications and alternative forms, a specific embodiment thereof has been shown by way of example in the drawings and will hereafter be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

What is described hereafter is a method and apparatus for permitting button selection using touch by determining when an object has touched a sensor panel, based on sensing or determining the velocity of the approaching object relative to the sensor panel. It should be appreciated that the object may be a user's finger, a hand-held stylus or any other object that can act as a capacitive load on the sensor panel. Using this technique, it is possible to reliably detect an object touch-down or lift-up event regardless of who uses the computer, and regardless of the existing climate conditions.

Referring now to FIG. 1, there is shown a functional block diagram of a computer 10 such as a notebook or mobile computer which incorporates the features of the present invention therein. The computer 10 includes a base or frame 12, a conventional electrostatic display screen or sensor panel 14 secured to the frame 12, a controller 16, and a conventional Central Processing Unit (CPU) 18. The sensor panel 14 is operatively connected to the controller 16 through corner wires 20a–20d, and the controller 16 is operatively connected to the CPU 18 through a serial data line 22 such as a serial port.

Figure 2:
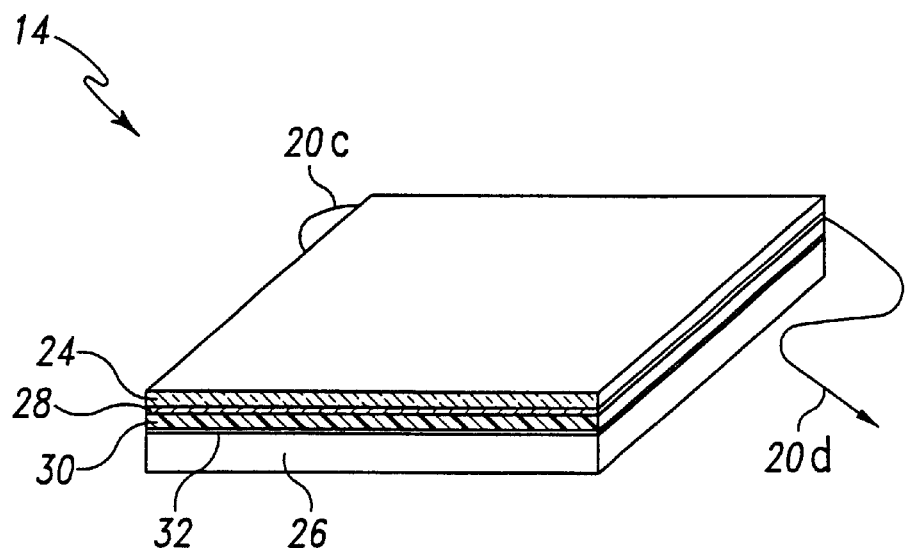
FIG. 2 is a perspective view of a sensor panel of the notebook computer taken along the line 2—2 in FIG. 1.

The electrostatic sensor panel 14 may include several layers of known material as shown in FIG. 2. In the embodiment being described, a glass layer 24 protects an LCD (Liquid Crystal Display) screen 26 which is disposed below the glass layer 24. An upper surface of the glass layer 24 defines a writing/touching surface for an object such as a hand-held stylus (not shown) or a user's finger (not shown). A lower surface of the glass layer 24 has a layer 28 of an active sensor material applied thereto. In the embodiment being described, the active sensor material is a thin coating of transparent indium-tin-oxide (ITO) which is typically used in electrostatic sensor panel applications.

Each corner wire 20a–20d is electrically connected to a respective corner of the active ITO layer 28 for carrying current flow generated as a result of an object approaching, touching or withdrawing from the glass layer 24 as described further below. A polyester spall shield 30 is attached to the underside of the active ITO layer 28 to prevent the glass surface 24 from shattering if ever broken. An air gap 32 separates the lower surface of the spall shield 30 from an upper surface of the LCD screen 26.

In operation, the active ITO layer 28 is biased with a voltage from the controller 16. More specifically, the controller 16 applies a biasing voltage to each corner of the active ITO layer 28 through the corner wires 20a–20d. In a quiescent state of the computer 10 (e.g. an object is not approaching the sensor panel), the sensor panel 14 is biased with the voltage from the controller 14, and ideally, no current flows through the corner wires 20a–20d. However, it should be appreciated that a finite amount of current may flow through the corner wires 20a–20d in a quiescent state of the sensor panel 14, due to the loading effects of stray capacitive coupling between the active ITO layer 28 and any metal components of the computer 10 proximate the active ITO layer 28.

When an object does approach the display screen 14, the object increasingly acts as a load that is capacitively coupled to the active ITO layer 28. More specifically, as the object moves closer to the active ITO layer 28, the capacitive coupling between the object and the active ITO layer 28 becomes greater. An object that is capacitively coupled to the active ITO layer 28 acts as a load on the active ITO layer 28 which results in current flow through each of the corners of the active ITO layer 28, and hence the corner wires 20a–20d.

It should be appreciated that the object cannot directly contact the active ITO layer 28 due to the presence of the glass layer 24. The closest that an object can come to the active ITO layer 28 is by contacting the glass layer 24. The capacitive coupling between the object and the active ITO layer 28 is the greatest when the object contacts the glass layer 24.

The magnitude of current flow through each of the corners of the active ITO layer 28 (and in each of the corner wires 20a–20d) due to an object which is capacitively coupled to the active ITO layer 28 is proportional to the conductivity of the active ITO layer 28 between each corner of the active ITO layer 28 and the object at, for example, an object position 31 on the glass layer 24 as shown in FIG. 1. More particularly, the relative thickness of the arrows extending from the object position 31 to each corner of the active ITO layer 28, is indicative of the magnitude of current flow through the respective corners of the active ITO layer 28 due to the position of the object relative to the active ITO layer 28.

Thus, the closer the object is to a particular corner of the active ITO layer 28, the greater the conductivity of the active ITO layer 28 and the greater the current flow through that corner, as depicted by the relative thickness of lines extending between the object position 31 and each of the corners of the active ITO layer 28. Likewise, the farther the object is from a particular corner of the active ITO layer 28, the lesser the conductivity of the active ITO layer 28 and the lesser the current flow through that corner. It should be appreciated that capacitive loading effects of an object vary from person to person, and for varying climate conditions. Thus, detecting when an object-touch has occurred cannot be accurately determined based solely upon the magnitude of current flow measured at the four corners of the active ITO layer 28.

Figure 3:
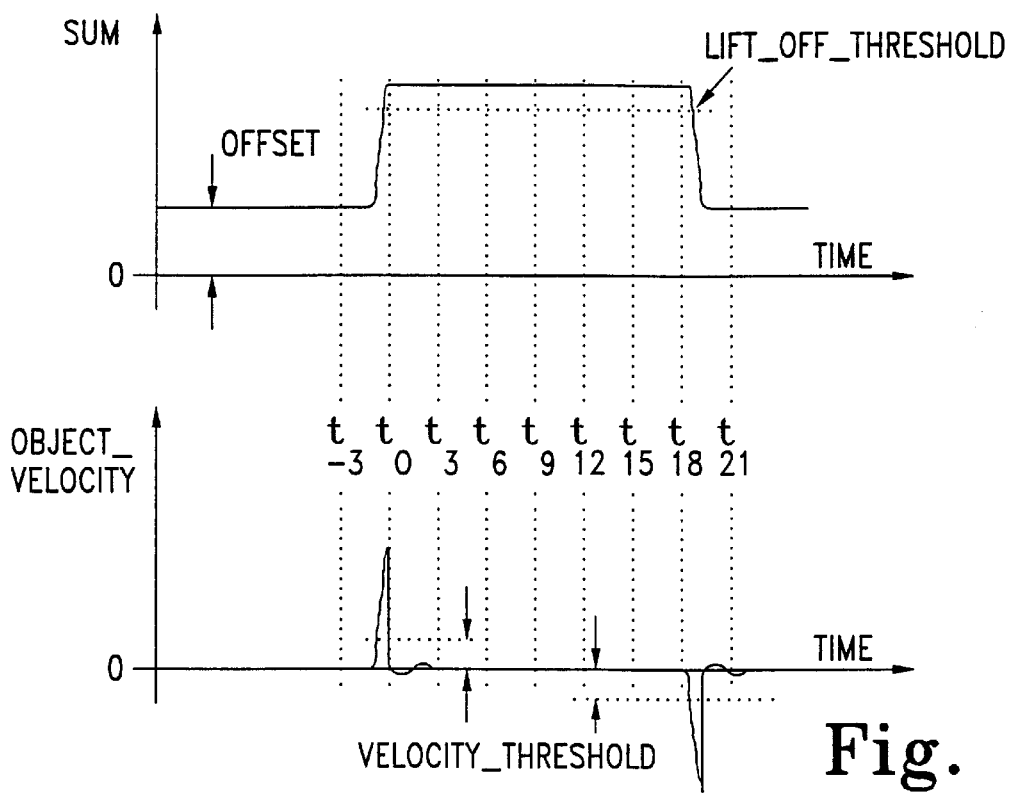
FIG. 3 is a graph illustrating the relationship between current flow versus time and velocity versus time as an object approaches, touches and then withdraws from the sensor panel shown in FIG. 2.

Referring now to FIGS. 3–6, a method for determining when an object has approached and/or touched the sensor panel 14 will now be described. FIG. 3 is a graph illustrating the relationship between the sum of current flowing (Sum) in the corner wires 20a–20d versus time, and the velocity of the object (Object_Velocity) versus time as the object approaches, touches and then withdraws from the sensor panel 14.

More particularly, FIG. 3 shows an object approaching the sensor panel 14 during the time period $t_{-3}$ $t_0$ to as evidenced by the increase in the total amount of current flowing through the corner wires 20a–20d, and by the positive going velocity of the approaching object. The time period $t_0$ to $t_{18}$ is indicative of the object contacting, or at least positioned adjacent, the glass layer 24 as evidenced by the maximum sustained level of total current flow in the corner wires 20a–20d, and by the lack of detected velocity of the object. The time period $t_{18}$ to $t_{21}$ is indicative of the object withdrawing from the sensor panel 14 as evidenced by the drop in the amount of total current flow through the corner wires 20a–20d as the capacitive coupling between the object and the active ITO layer 28 is reduced, and by the negative-going velocity of the withdrawing object.

Figure 4:
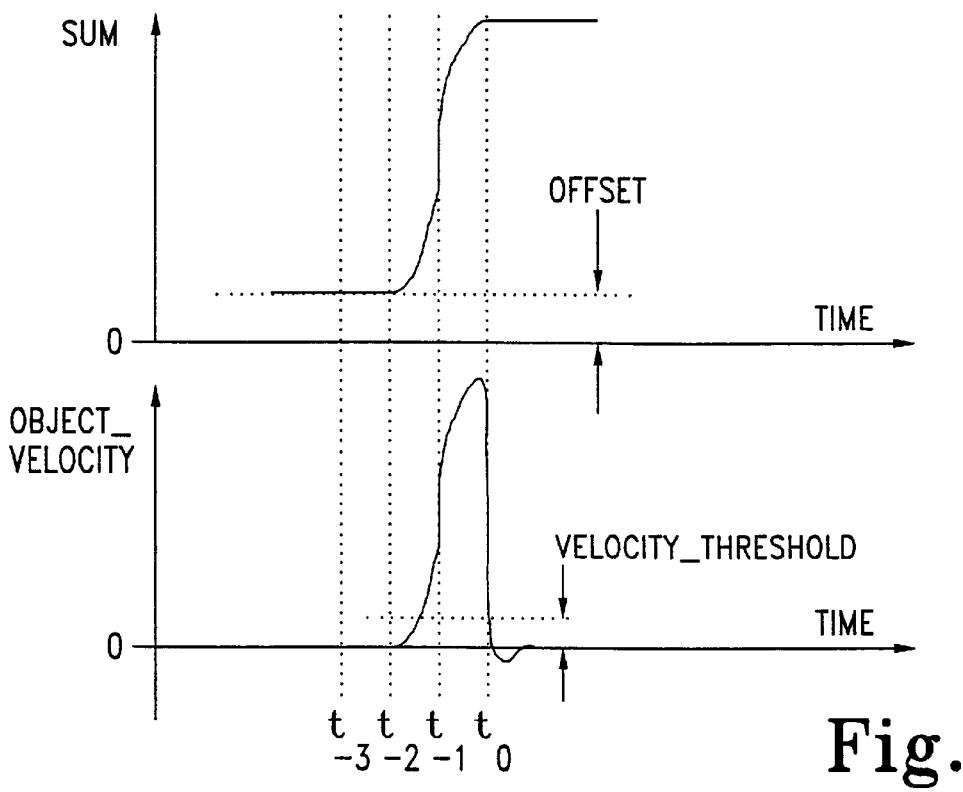
FIG. 4 is a graph showing an expanded portion of the graph from $t_{-3}$ to $t_0$ in FIG. 3.

FIG. 4 is an expanded graph showing the relationship between the total current flowing (Sum) in the corner wires 20a–20d versus time, and the velocity of the object (Object_Velocity) versus time during the time period $t_{-3}$ to $t_0$ of FIG. 3. It should be appreciated that the velocity of the object is shifted in time relative to the current flow in the corner wires 20a–20d due to the time delay incurred in digitally filtering the Sum data for the object. That is, the Object_Velocity values shown in FIGS. 3 and 4 represent digitally filtered data that is shifted in time relative to the raw data values (i.e. data that is not digitally filtered). Thus, the Object_Velocity values peak at a point where the slope of the Sum versus time graph is zero (at time $t_0$), as opposed to the raw velocity values which would normally peak at a point where the slope of the Sum versus time graph is maximum (at time $t_{-1}$).

Figure 5:
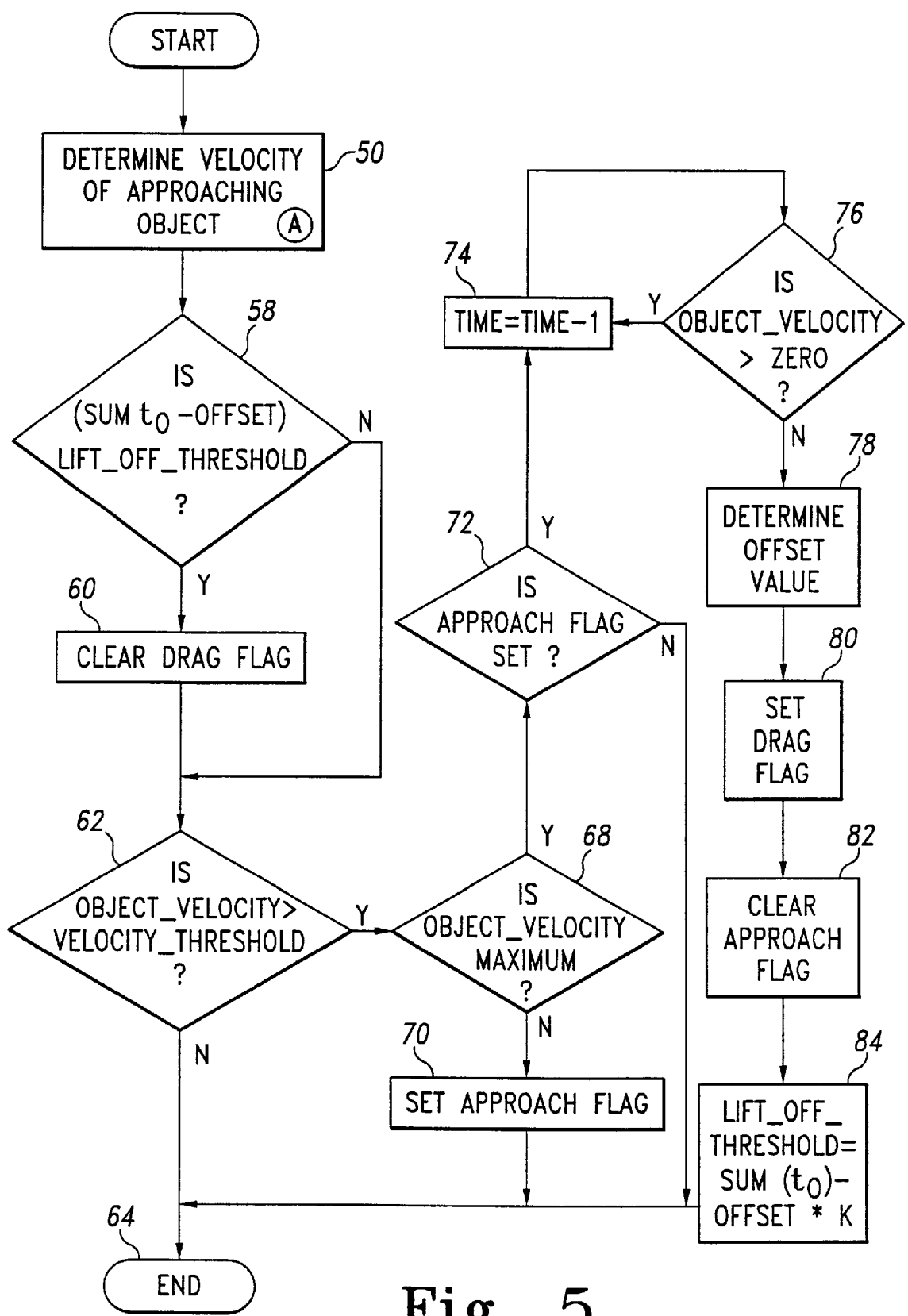
FIG. 5 is a flow chart for determining when an object has touched the sensor panel of the notebook computer shown in FIG. 1.
Figure 6:
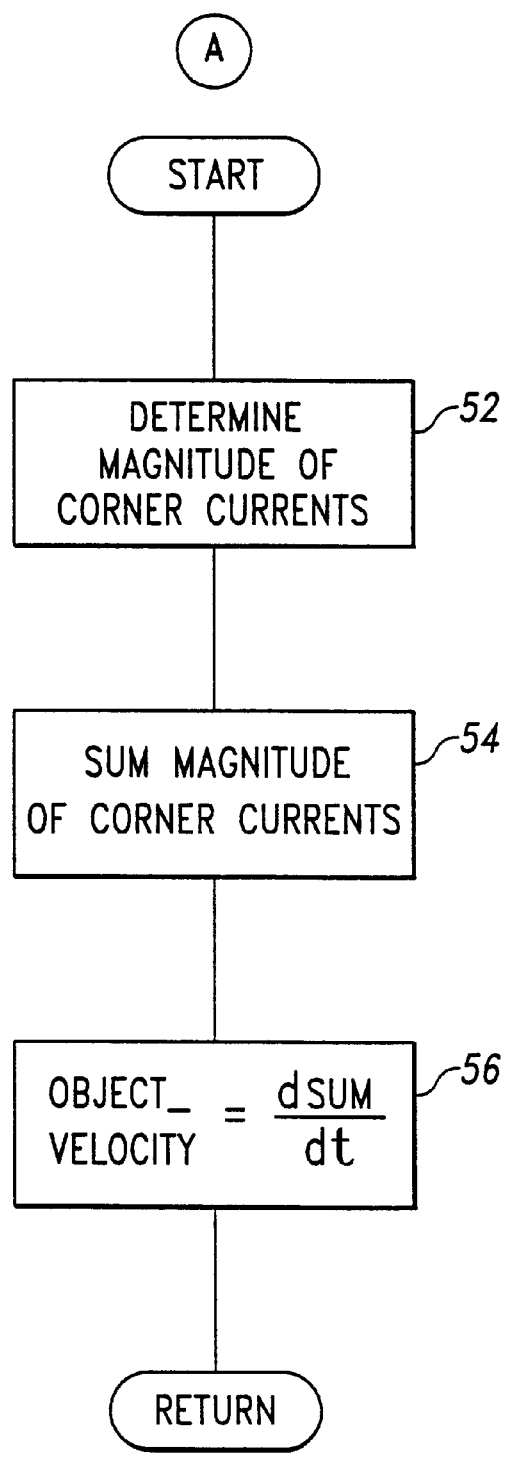
FIG. 6 is a flow chart for determining the velocity of an object as it approaches or withdraws from the sensor panel shown in FIG. 2.

FIGS. 5 and 6 are flowcharts setting forth a preferred embodiment which permits the controller 16 to determine when an object has touched and/or withdrawn from the sensor panel 14. In particular, the controller 16 is periodically interrupted in a conventional manner so as to execute the routine represented by the flowcharts of FIGS. 5 and 6. In the embodiment being described, the controller 16 may be configured in a conventional manner to adjust the time periods (t) between iterations of the routine from approximately 5 msec to approximately 20 msec. That is, the time period between iterations of the routine are selectable by a user in a conventional manner.

Referring now to FIG. 5, the initial step 50 for determining when an approaching object has touched the sensor panel 14 is to determine the velocity of the object relative to the sensor panel 14 during the current iteration of the routine. FIG. 6 shows the routine for determining the velocity of the object relative to the sensor panel 14. Referring to step 52, the controller 16 determines the velocity of the approaching object by first sampling each of the corner wires 20a–20d during the current iteration of the routine to determine the magnitude of current flowing therein. It should be appreciated that if there is no object approaching the sensor panel 14, then the magnitude of current flowing therein should be approximately zero.

As previously mentioned, the capacitive load on the sensor panel 14 increases as an object approaches the sensor panel 14, thus causing current to flow in each of the corner wires 20a–20d. If the controller 16 detects current flow in the corner wires 20a–20d, the magnitude of current flow in each corner wire 20a–20d is conventionally analog-to-digital converted into a binary value within the controller 16. The resulting binary values represent the magnitude of current flow in each of the corner wires 20a–20d and the respective corners of the sensor panel 14 during the current iteration of the routine The binary values representing the current flow in each of the corner wires 20a–20d are added together in step 54 and assigned to a variable value referred to as a Sum. In step 56, the controller 16 determines the velocity of the approaching object by implementing known techniques to calculate the first derivative of the Sum value. It should be appreciated that a first derivative may be determined using known digital filtering techniques implemented in either hardware or software within the controller 16. The calculated value for the velocity of the approaching object is assigned to a variable value named Object_Velocity. It should be appreciated that as the object approaches the sensor panel 14, the magnitude of the Object_Velocity value will be positive, and as the object withdraws from the sensor panel 14, the magnitude of the Object_Velocity value will be negative. In addition, if there is no object approaching the sensor panel 14, the magnitude of the Object_Velocity value will be substantially zero.

Once the Sum and Object_Velocity values have been determined, the routine advances to step 58 (FIG. 5). The purpose of steps 58 and 60 is to determine if an object that was contacting the sensor panel 14 during a previous iteration of the routine (i.e. a Drag flag that is discussed below was set during a previous iteration) has been withdrawn from the sensor panel 14. In particular, the controller 16 subtracts a variable value referred to as an Offset (discussed further below) from the Sum variable determined in step 54, and then determines whether the result is less than a predetermined threshold value referred to as a Lift_Off_Threshold (discussed further below).

If the result of step 58 is true (i.e. Sum−Offset<Lift_Off_Threshold, where the Sum variable is determined during the present iteration of the routine and the Offset and Lift_Off_Threshold variables were determined during the previous iteration of the routine as discussed further below), then an object has been withdrawn from the sensor panel 14. That is, the present iteration of the routine falls within the time period $t_{18}$ to $t_{21}$ (FIG. 3). The routine then advances to step 60 to clear the Drag flag (discussed further below) to indicate that an object is not currently contacting the sensor panel 14. The routine then advances to step 62

If the result of step 58 is false (i.e. Sum−Offset≧Lift_Off_Threshold), then the routine passes directly to step 62. In step 62, the controller 16 determines whether an object is approaching the sensor panel 14 by comparing the velocity of the object with a predetermined velocity threshold. In particular, the controller 16 determines whether the Object_Velocity variable is greater than a constant named Velocity_Threshold. As shown in FIGS. 3 and 4, the value of the Velocity_Threshold constant is set or chosen as a minimum threshold to insure that random noise or interference does not falsely indicate that an object is approaching the sensor panel 14. Thus, if no object is approaching the sensor panel 14, the Object_Velocity value will be substantially zero and therefore below the Velocity_Threshold constant.

If the controller 16 determines that the Object_Velocity variable is less than or equal to the Velocity_Threshold constant in step 62, then an object is not approaching the sensor panel 14, and the routine advances to step 64 where the current iteration of the routine ends. After a predetermined time period, the controller 16 will be interrupted again in order to execute the next iteration of the routine shown in FIGS. 5 and 6 starting at step 50. More specifically, the foregoing steps will repeat for subsequent iterations of the routine until the controller 16 determines that the Object_Velocity variable is greater than the Velocity_Threshold value in step 62 (i.e. the object is approaching the sensor panel 14).

When the Object_Velocity value is greater that the Velocity_Threshold value in step 62, the controller 16 determines that an object is approaching the sensor panel 14 and the routine advances to step 68. That is, the present iteration of the routine falls within the time period $t_{-1}$ to $t_0$ (FIG. 4). The purpose of step 68 is to determine whether the approaching object has contacted the sensor panel 14 by determining whether the value of the Object_Velocity variable is increasing. In particular, the controller 16 compares the current Object_Velocity variable (determined in step 56 of the current iteration of the routine) with the Object_Velocity variable determined during the previous iteration of the routine.

If the controller 16 determines that the current Object_Velocity variable is greater than the previous Object_Velocity variable, the object has not yet contacted the sensor panel 14. That is, the present iteration of the routine is still within the time period $t_{-1}$ to $t_0$ (FIG. 4) and the value for the current Object_Velocity variable has not yet reached a peak or maximum value as shown in FIG. 4, i.e. the values of the Object_Velocity variables are still increasing. The routine then advances to step 70.

In step 70, the controller 16 sets the Approach flag to indicate that the object is approaching the sensor panel 14, and the routine advances to step 64 where the current iteration of the routine ends. After a predetermined time period, the controller 16 will be interrupted again in order to execute the next iteration of the routine shown in FIGS. 5 and 6 starting at step 50. More specifically, the foregoing steps will repeat for subsequent iterations of the routine until the controller 16 determines that the value of the Object_Velocity variable has peaked or reached a maximum value, i.e. is no longer increasing.

Referring again to step 68, if controller 16 determines that the current Object_Velocity variable is less than or equal to the previous Object_Velocity variable, then the object has finally contacted the sensor panel 14. That is, the present iteration of the routine is still within the time period $t_{-1}$ to $t_0$ (FIG. 4) and the value of the Object_Velocity variable has peaked or reached a maximum value as shown in FIG. 4. The routine then advances to step 72.

The purpose of step 72 is to determine if the Approach flag is currently set (i.e. the object was previously approaching the sensor panel 14 during the previous iteration of routine). If the controller 16 determines that the Approach flag is set, the routine advances to step 74. If the controller 16 determines that the Approach flag was not set, the routine advances to step 64 to end the present iteration of the routine.

Steps 74 and 76 cooperate to define a looping function which has as its object, the determination of the Offset variable which will be subtracted from the Sum variable in step 58 during the next iteration of the routine. The Offset value is useful for accurately determining the position of the object relative to the sensor panel 14 once it has been determined that the object is contacting the sensor panel 14. To calculate the Offset value as shown in FIGS. 3 and 4, the controller 16 must determine the last iteration where the Object_Velocity variable was equal to zero. For example, the last iteration where the velocity of the object was zero was during iteration $t_{-2}$ as shown in FIG. 3.

In step 74, a counter value referred to as Time is initially assigned a value of zero, and is then decremented by one (i.e. from zero to −1) prior to the routine advancing to step 76. In step 76, the controller 16 determines whether the Object_Velocity value for the iteration ($t_{-1}$) (i.e. Object_Velocity (Time) or Object_Velocity($t_{-1}$)), was greater than zero. Since the Object_Velocity value was greater than zero during the iteration ($t_{-1}$), the routine loops back to step 74 to decrement the Time value again (i.e. from −1 to −2). The routine then advances back to step 76 where the controller 16 determines that the Object_Velocity value for the iteration ($t_{-2}$) was not greater than zero.

The routine advances to step 78 after finding a previous Object_Velocity value that was not greater than zero, for example the Object_Velocity value during the iteration ($t_{-2}$) as shown in FIG. 4. In step 78, the controller 16 sets the Offset variable equal to the Sum variable that was determined in step 54 of the iteration identified by the Time value.

For example, the controller 16 sets the Offset variable equal to the value of the Sum variable during the iteration ($t_{-2}$) in FIG. 4.

The routine then advances to step 80 where an object touch-down signal is generated. In the embodiment being described, the object touch-down signal takes the form of setting the Drag flag. The Drag flag signals or otherwise indicates that an object is presently touching the sensor panel 14 so that the controller 16 can subsequently perform other tasks such as determining the position of the touching object relative to the sensor panel 14. After the Drag flag is set, the routine advances to step 82 to clear the Approach flag before advancing to step 84 to determine a value for the Lift_Off_Threshold value for use in subsequent iterations of the routine.

In step 84, the controller 16 determines the Lift_Off_Threshold value by subtracting the current Offset value from the current Sum value and multiplying the result by an arbitrary constant K. As shown in FIG. 3, the Lift_Off_Threshold value provides an indication of when an object has been withdrawn from contacting the sensor panel 14. That is, during subsequent iterations of the routine, while the object remains in contact with the sensor panel 14, the Sum value determined in step 54 will fluctuate due to variations in the capacitive load of the object.

For example, if the value of K=0.9, the Sum value will have to drop by approximately 10% before the routine will accept that the object has been withdrawn from the sensor panel 14, thus preventing erroneous object lift-off indications. That is, in step 58 (FIG. 5), the controller 16 determines whether the Sum value minus the Offset value is less than the Lift_Off_Threshold value.

What has been described above is a method and apparatus for permitting button selection using touch by determining when an object such has touched a sensor panel, based on sensing or determining the velocity of an approaching object relative to the sensor panel. It should be appreciated that the object may be a user's finger, a hand-held stylus or any other object that can act as a capacitive load on the sensor panel. Using this technique, it is possible to reliably detect an object touch-down or lift-up event regardless of who uses the computer, and regardless of the existing climate conditions.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for determining when an approaching object has contacted a sensor panel, comprising:
    a digital filter for determining a first derivative of a current flow in a sensor panel as an object approaches the sensor panel;
    a controller for determining when said first derivative has reached a maximum value; and
    a routine for generating an object touch-down signal when said first derivative has reached said maximum value to indicate that the object approaching the sensor panel has contacted the sensor panel.

2. The apparatus of claim 1, wherein the sensor panel includes an active sensor layer for permitting the current flow to change as the object approaches the sensor panel.

3. The apparatus of claim 1 wherein said controller determines a magnitude value for said current flow.

4. The apparatus of claim 2, wherein said active sensor layer includes a plurality of corners, and said current flow is divided among said corners as the object approaches the sensor panel.

5. The apparatus of claim 4 wherein said controller determines a magnitude value for said current flow in each corner of said plurality of corners; and said controller sums said magnitude values for said current flow in each corner of said plurality of corners.

6. The apparatus of claim 2, wherein said sensor panel is an electrostatic sensor panel and said active sensor layer includes an indium-tin-oxide material.

7. The apparatus of claim 1, wherein said approaching object is a user's finger.

8. The apparatus of claim 1, wherein said approaching object is a stylus.

* * * * *